United States Patent

Boelstler et al.

[11] Patent Number: 6,142,525
[45] Date of Patent: Nov. 7, 2000

[54] ANCHOR FOR SEAT BELT COMPONENT

[75] Inventors: Richard A. Boelstler, Lake Orion; David R. Arnold, Macomb Township, Macomb County, both of Mich.

[73] Assignee: Breed Automotive Technology, Inc., Lakeland, Fla.

[21] Appl. No.: 09/292,271

[22] Filed: Apr. 15, 1999

[51] Int. Cl.[7] .................................................. B60R 22/00
[52] U.S. Cl. ........................ 280/808; 411/353; 411/999
[58] Field of Search ................. 280/801.1, 808; 411/533, 352, 353, 970, 999; 24/633, 632

[56] References Cited

U.S. PATENT DOCUMENTS

| | | | |
|---|---|---|---|
| 3,137,336 | 6/1964 | Wing | 411/999 |
| 3,217,774 | 11/1965 | Pelochino | 411/353 |
| 4,464,090 | 8/1984 | Duran | 411/353 |
| 5,096,224 | 3/1992 | Murakami et al. | 280/808 |
| 5,513,880 | 5/1996 | Ohira et al. | 280/808 |
| 5,918,903 | 7/1999 | Ito | 280/801.1 |

*Primary Examiner*—Lanna Mai
*Assistant Examiner*—Lynda Jasmin
*Attorney, Agent, or Firm*—Markell Seitzman

[57] ABSTRACT

An anchor mechanism (200, 200a) has a load bearing plate (202) having a first opening (210). The plate coated by a coating material (214) at least in the vicinity of the first opening. The coating material (214) proximate opening (210a) being formed into a breakaway retaining ring (220) which functions to retaining a fastening bolt (82,82a) to the coated plate prior to installation and which breaks away during installation of the anchor mechanism to a cooperating part (102).

5 Claims, 11 Drawing Sheets

ANCHOR FOR SEAT BELT COMPONENT

BACKGROUND AND SUMMARY OF THE INVENTION

The present invention generally relates to an anchor mechanism that is usable within a seat belt system.

Figure 1:
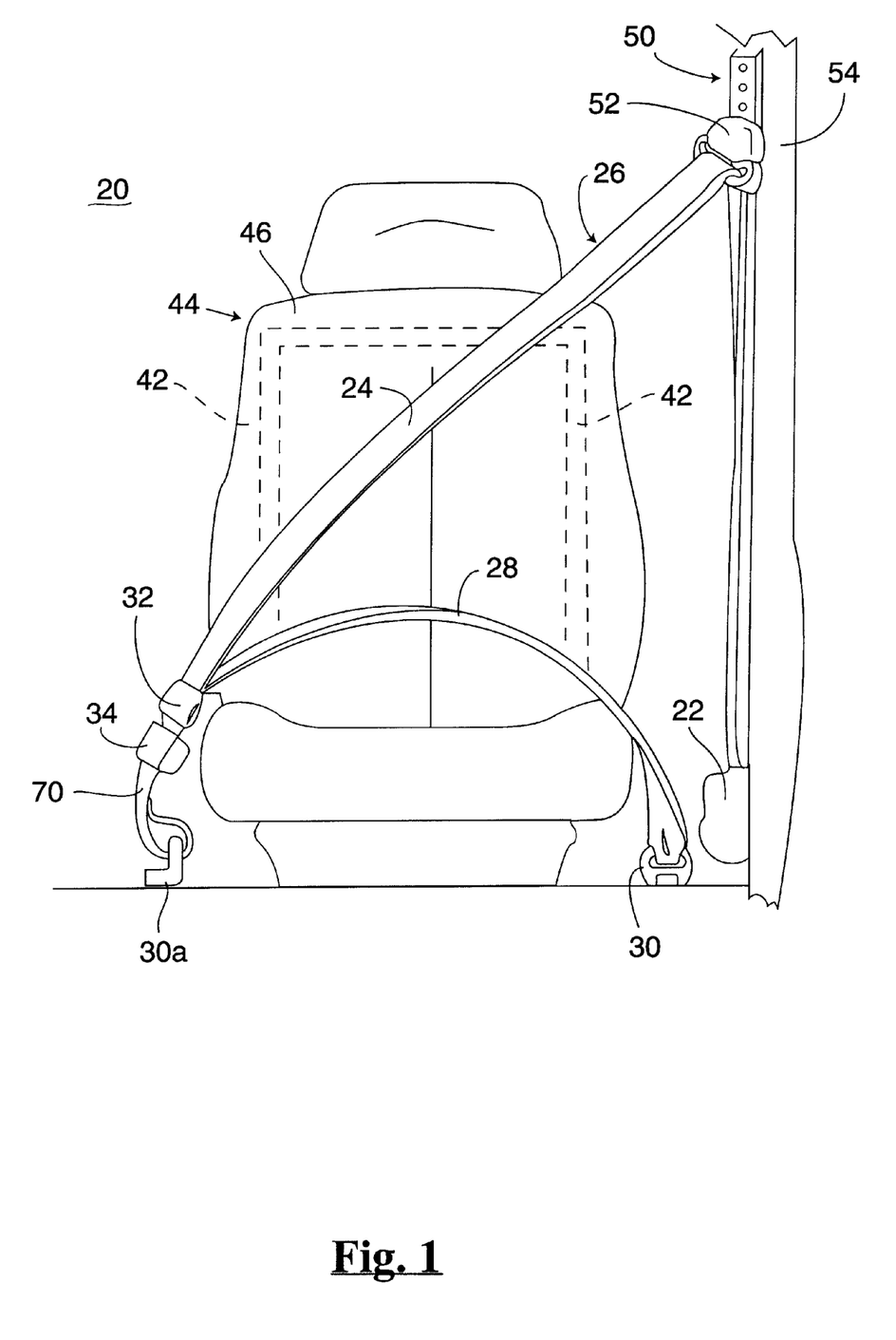
FIG. 1 illustrates a typical three-point seat system.

FIG. 1 shows a typical three-point seat belt system 20 comprising a retractor 22, and a length of seat belt webbing 24 divided into a shoulder belt 26 and a lap belt 28. The lap belt 28 is anchored to the floor by a conventional anchor 30. The demarcation between the shoulder belt 26 and lap belt 28 is often defined by the tongue 32 which is inserted within a seat belt buckle 34, also anchored by an appropriate anchor mechanism such as 30a (which can be the same as anchor 30). The shoulder belt 26 is supported by a web guide 52 which can be part of a height adjusting mechanism 50 secured to a structural portion of the vehicle or to a frame of a seat. As is known in the art, the seat belt system can be secured to a frame 42 located within a seat back 44 of the seat 46 or secured as illustrated exterior thereto. The web guide 52 can alternatively be directly secured to a vehicle frame component 54 such as the B and C pillar.

Figure 2:
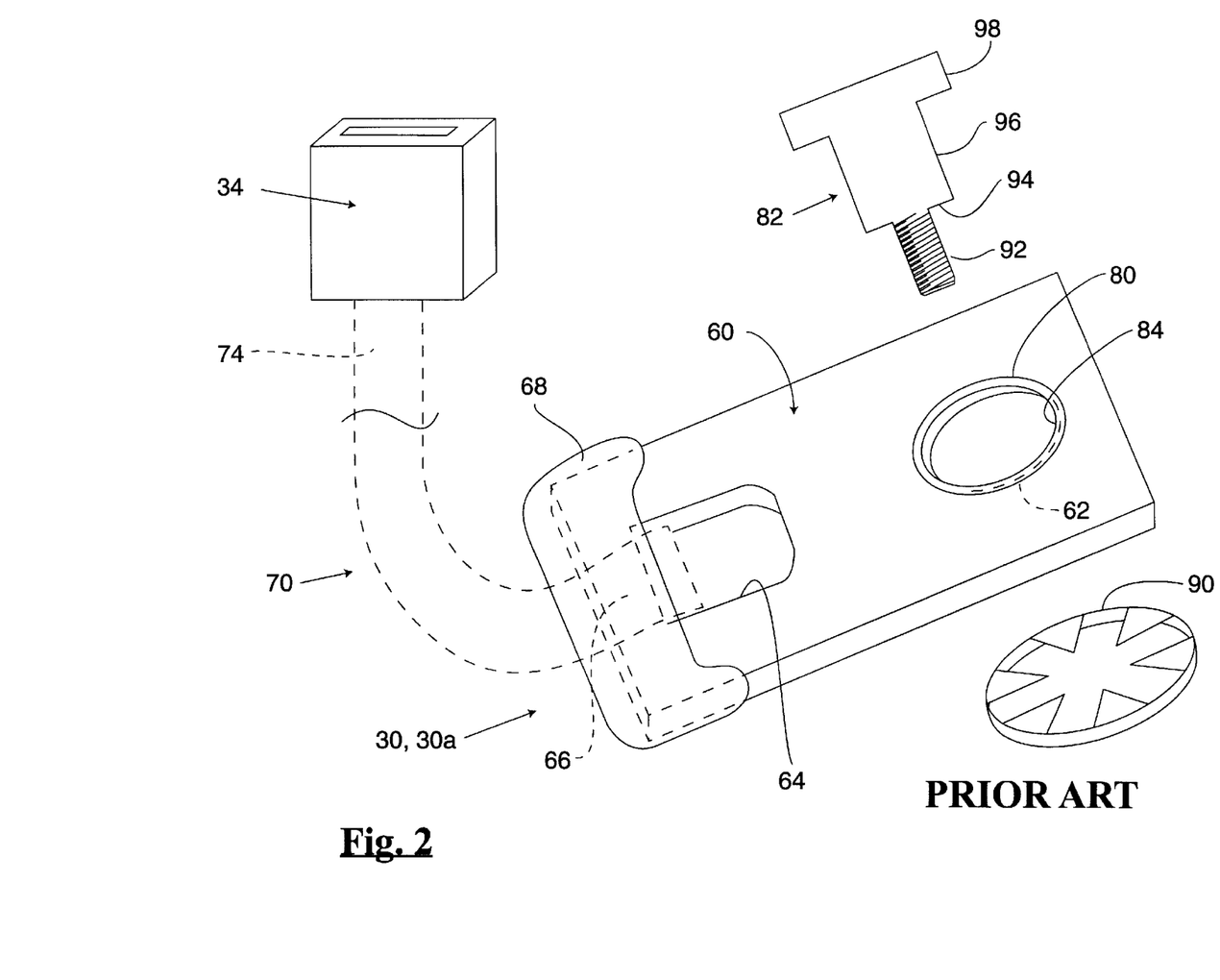
FIGS. 2 and 3 represent prior art seat belt anchor mechanisms.
Figure 3:
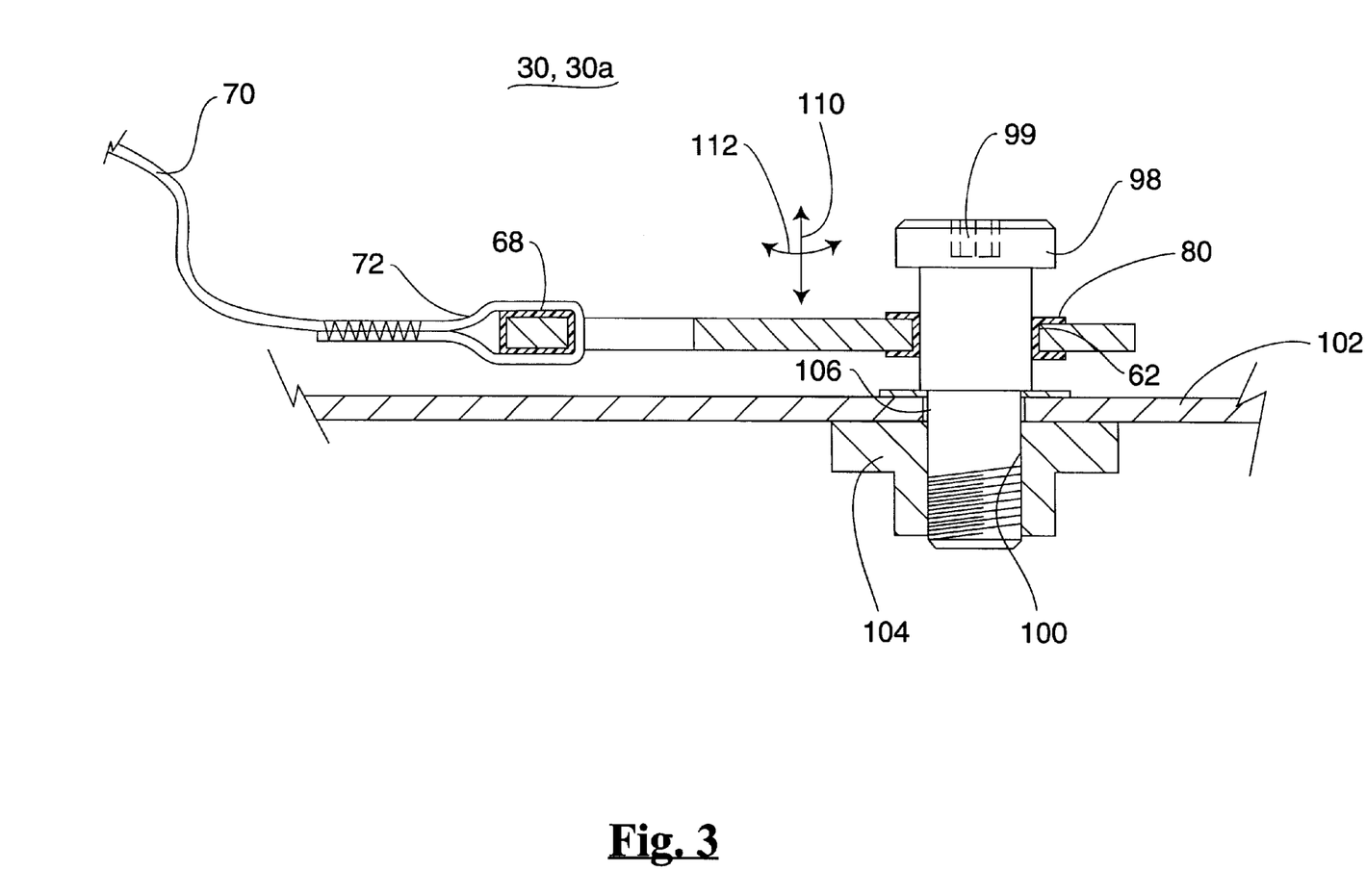
Figure 4:
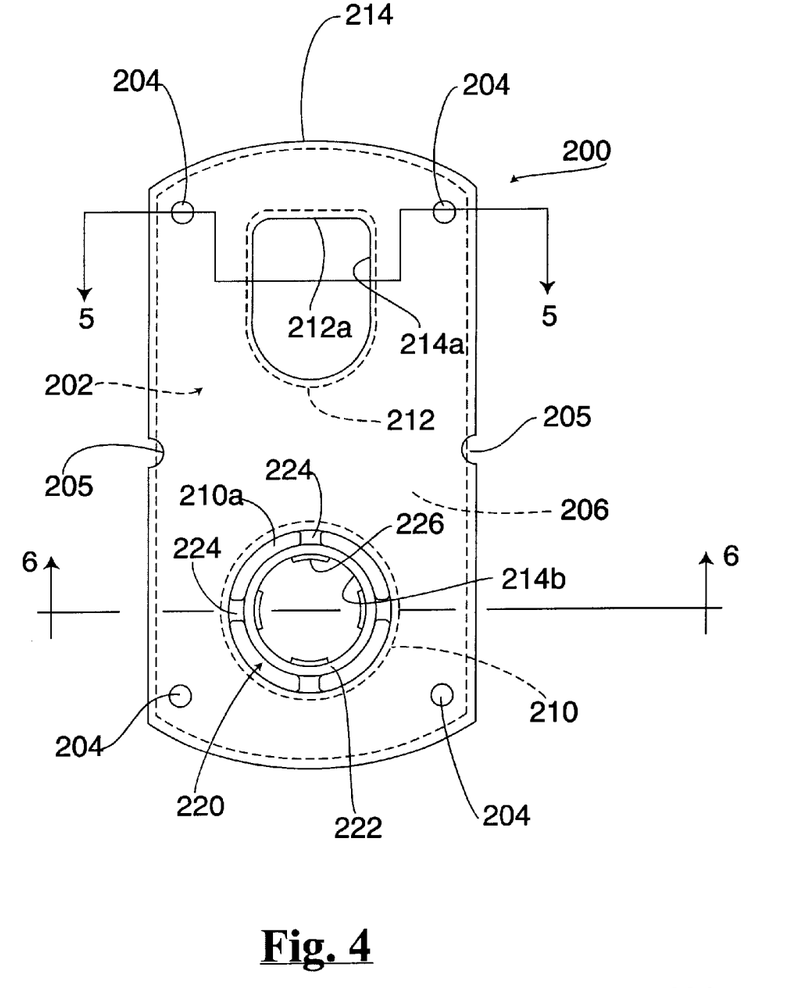
FIG. 4 is a plan view of an anchor plate incorporating the features of the present invention.
Figure 5:
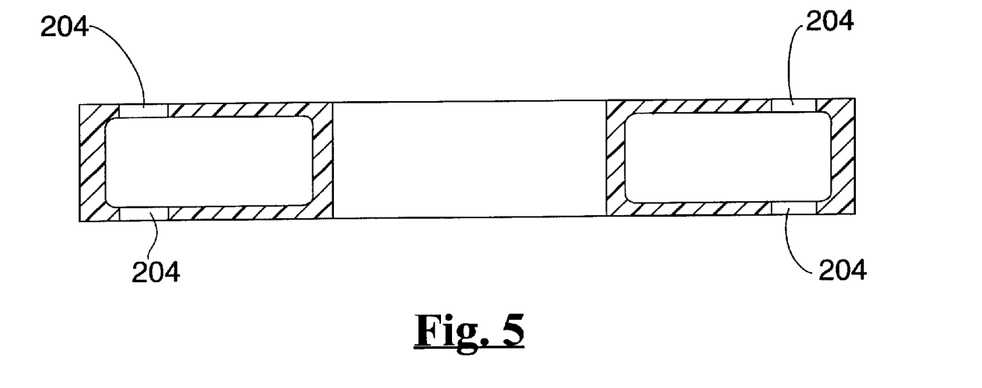
FIG. 5 is a cross-section view through section 5—5 of FIG. 4.

Reference is now made to FIGS. 2 and 3 which show a prior art anchor mechanism such as 30 or 30a. This type of anchor mechanism is typically used to secure the buckle 34 or lap belt 28 to a vehicle structural member such as a floor or a seat frame. This or a similar type of anchor can also be used to connect the D-ring or web guide 52 to the height adjusting mechanism 50 or directly to a structural member 54 or seat frame 42 of a seat.

Anchor mechanisms such as 30 (or 30a) comprise a steel plate 60 having a circular first opening 62 and an oblong second opening 64. The plate 60 is typically fully coated with a anti-corrosive coating (not shown) such a dichromate, paint, zinc plating, etc. One end such as 66 of the plate, proximate an end of opening 64, is further coated with a three-dimensional, abrasion resistant, elastomeric coating 68 to prevent an anchor strap 70 from being abraded upon any rough metal corners. In the embodiment illustrated in FIGS. 2 and 3, the anchor strap 70 is made from a length of seat belt webbing. One end of the strap such as 72 is looped about end 66 and the coating 68. The other end 74 of the strap 70 is secured, in a known manner, to the buckle 34. Opening 64 can have alternate shapes such as circular and the anchor strap can be formed by a Bowden cable secured therein. The opening 62 is sized to receive a plastic bushing 80, having a passage or opening 84. The bushing provides a low friction surface for a fastener such as stepped bolt 82. The bushing 80 also reduces vibrational noise. Prior to installation of the anchor mechanism 30 within the vehicle, the bolt 82 is inserted within opening 84 and retained therein by a thin speed nut or star washer or similar fastener or retainer 90. The retainer 90 holds the bolt 82 to the plate 60 prior to installation.

The bolt 82 includes a narrow diameter threaded portion 92 with threads 92a, a shoulder 94, a larger diameter smooth portion or neck 96 and a head 98 capable of being twisted by a tool. The head 98 can take on many shapes, such as hexagonal, square or alternatively a screw driver slot 99 may be provided in the center of the head 98. During installation, the threaded portion 92 is received within a threaded opening 100 within the vehicle structural part generally referred to as 102. This part 102 can be the seat frame or B or C pillars or other part of the vehicle. The bolt 82 is subsequently fastened to the structural part 102 trapping the nut 90 between the shoulder 94 and the structural part 102. As can be appreciated, the threaded opening 100 can be formed within a threaded bolt 104 secured to the part 102 or, alternatively, the opening 106 of the part 102 can be tapped.

Subsequent to installation the plate 60 is received about the neck 96 of the fastener 82 and plate 60 is free to rotate and slide about the neck 96 to accommodate movement of the buckle 34 or shoulder belt 28 or other safety component secured thereto as the seat belt is secured about the occupant or if the seat 46 is moved from its nominal position. The longitudinal movement of the plate 60 is shown by arrow 110 and arrow 112 indicates that the plate can also rotate about the axis of the bolt 82.

However, as can be seen from the above, one of the deficiencies of the prior art design is that the bolt 82 is secured to the plate 60 by a separate retainer 90. Further, to permit the plate to rotate smoothly about the fastener 82, the separate bushing is required and if the attachment strap 70 is accomplished by seat belt webbing, the plate must further be coated with a protective coating 68 as well as protected by the anti-corrosive coating.

It is an object of the present invention to provide an improved anchor mechanism having a reduced parts count and one easier to install within the vehicle. A further object of the present invention is to provide an anchor mechanism having an integrally formed bolt retainer that is capable of securing an attachment bolt to an anchor plate prior to installation in the vehicle and one which breaks away from the anchor plate during installation into a vehicle (including a seat).

Accordingly, the invention comprises: an anchor mechanism comprising: a load bearing plate having first opening. The plate is coated by a coating material at least in the vicinity of the first opening. The coating material proximate the first opening is formed into a breakaway retaining ring which functions to retaining a fastening bolt to the coated plate prior to installation and which breaks away during installation of the anchor mechanism to a corresponding vehicle part. The plate may include a second opening secured to another seat belt component such as a buckle via an anchor strap or cable. The anchor mechanism can be used as a D-ring or web guide wherein the second opening comprises a narrow, arcuate web slot.

Many other objects and purposes of the invention will be clear from the following detailed description of the drawings.

DETAILED DESCRIPTION OF THE DRAWINGS

Reference is made to FIGS. 4–11 which illustrate an improved anchor mechanism 200. The mechanism 200 comprises a steel, load bearing anchor plate 202 having a plurality of mold-locating pins such as 204 integrally formed and extending outwardly from the body 206 of the plate 202. The plate includes a circular, first opening 210 and an oblong second opening 212. The anchor plate 202 is covered by a protective plastic coating 214 which encases anchor plate 202 including the walls of the openings 210 and 212. The plate 202 further includes a plurality of locating grooves or notches 205 which assist in properly locating the plate 202 within the injection molding machine. The pins 204 are used in conjunction with the molding machine to insure that the coating flows across the plate 202. The coating 214a about opening 212 forms an opening 212a and provides a protective layer about the plate 202 to prevent the anchor strap from being abraded. In this manner the present invention utilizes a single coating 214 to replace the anti-corrosive coating used in the prior art as well as replaces the anti-abrasive coating 68 shown in FIGS. 2 and 3. The coating 214b coats the edges of the opening 210, forming an opening 210a, thereby providing an integral bushing for the fastener 82 thereby replacing bushing 80 of the prior art.

Figure 6:
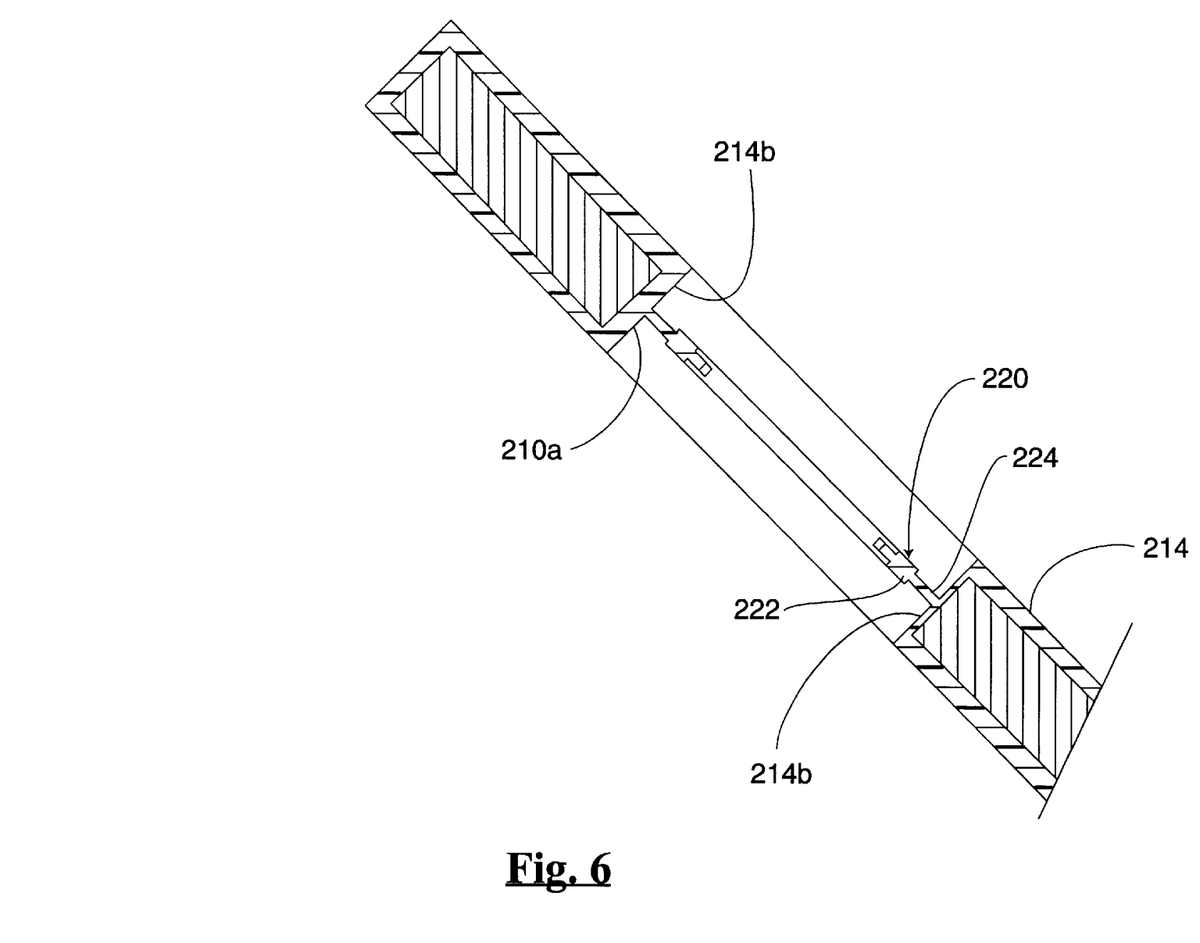
FIG. 6 is a cross-sectional view through section 6—6 of FIG. 4.
Figure 7:
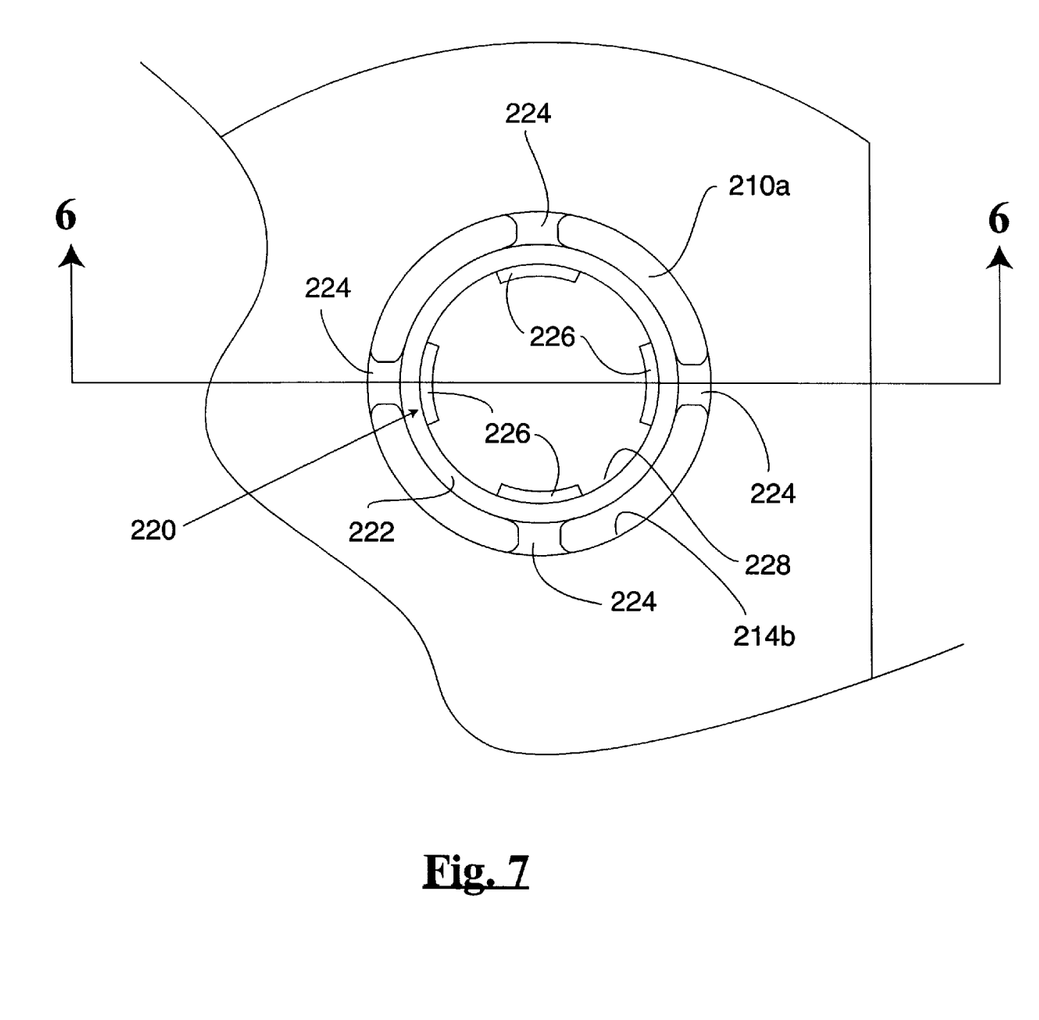
FIG. 7 is a partial plan view of an integrally formed retaining mechanism.
Figure 8:
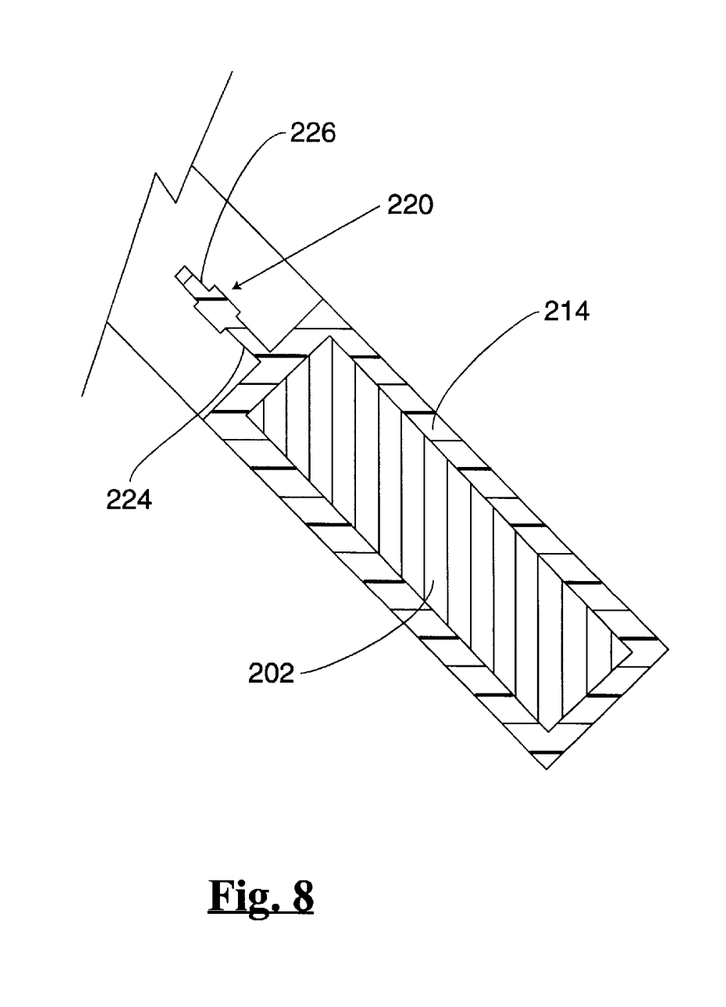
FIG. 8 is a partial cross-sectional view illustrating further details of a breakaway retaining mechanism.

As previously mentioned, one of the objects of the present invention is to provide an anchor mechanism that includes an integrally formed, breakaway retainer. With reference to FIG. 6, an integral retainer 220 of the coating material 214 is formed within opening 210a. The retainer 220 includes a ring 222 positioned concentric to opening 210a. The ring 222 is supported by a plurality of ribs or bridges 224 which extend from the coating 214b, which as mentioned forms opening 210a. The ribs 224 are located between the top and bottom of the coating 214b. As can be seen, the thickness of these ribs 224 is substantially thinner than the thickness of the ring 222. The thickness of the ribs 224 is sufficient to prevent the ribs from breaking, with the bolt 82 installed therein prior to installation within the vehicle. The ring 222 includes a plurality of arcuate, flexible webs 226. As can be seen, four webs 226 are equally spaced about the center opening 228 of the ring 222. As can be appreciated two or more webs can be used to locate and hold the fastener 82. When the threaded portion 92 of the fastener 82 is pushed into an opening 228 of the ring 222, the webs 226 deform and ratchet over the threads 92a and become lodged within the valley of the threads securing the bolt 82 to the ring 222.

Figure 9:
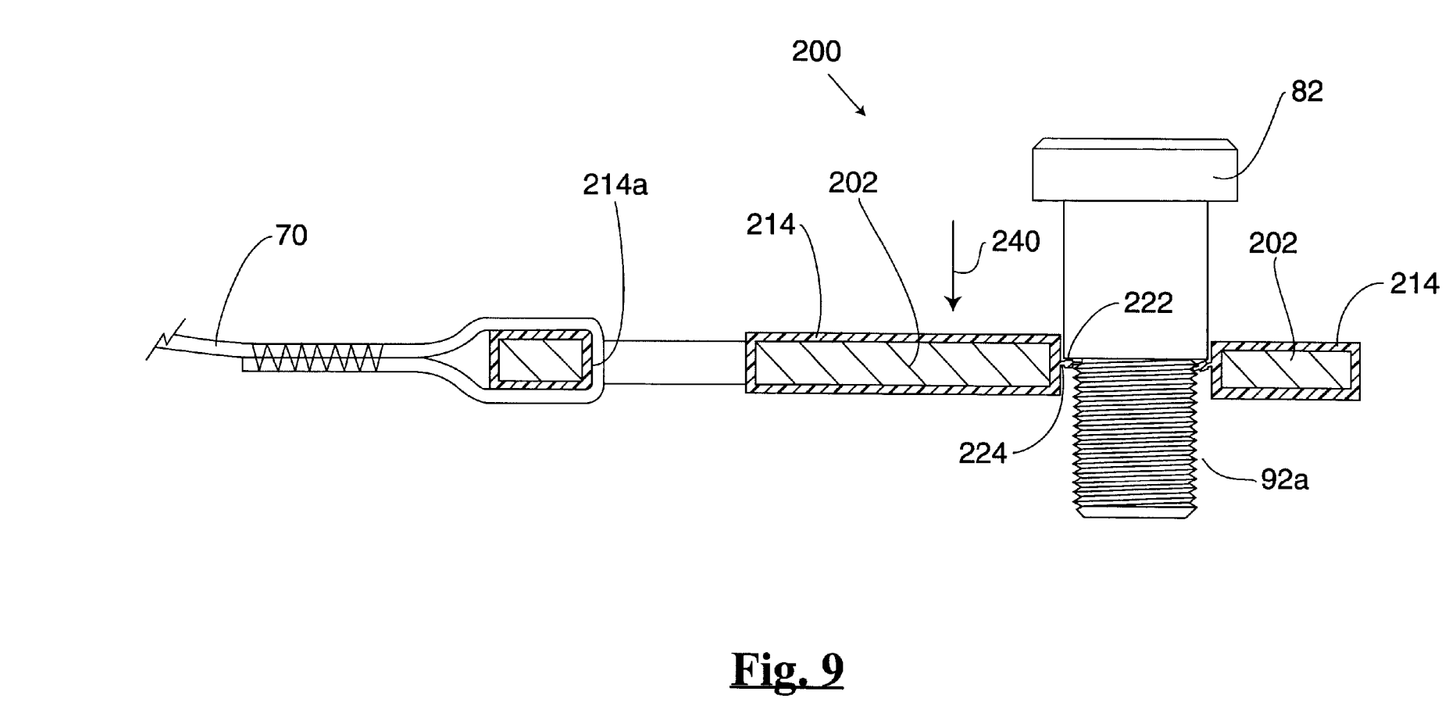
FIG. 9 shows the anchor mechanism of the present invention, prior to installation within the vehicle.

Reference is briefly made to FIG. 9 which illustrates a cross-sectional view through the anchor mechanism taken through section line 9—9. FIG. 9 also shows the bolt 82 pushed into the ring 222 with the wings 226 positioned within the valley of the thread 92a thereby holding the bolt 82 to the coated plate 202. The securement strap 70 is shown in phantom line secured within opening 214a.

Figure 10:
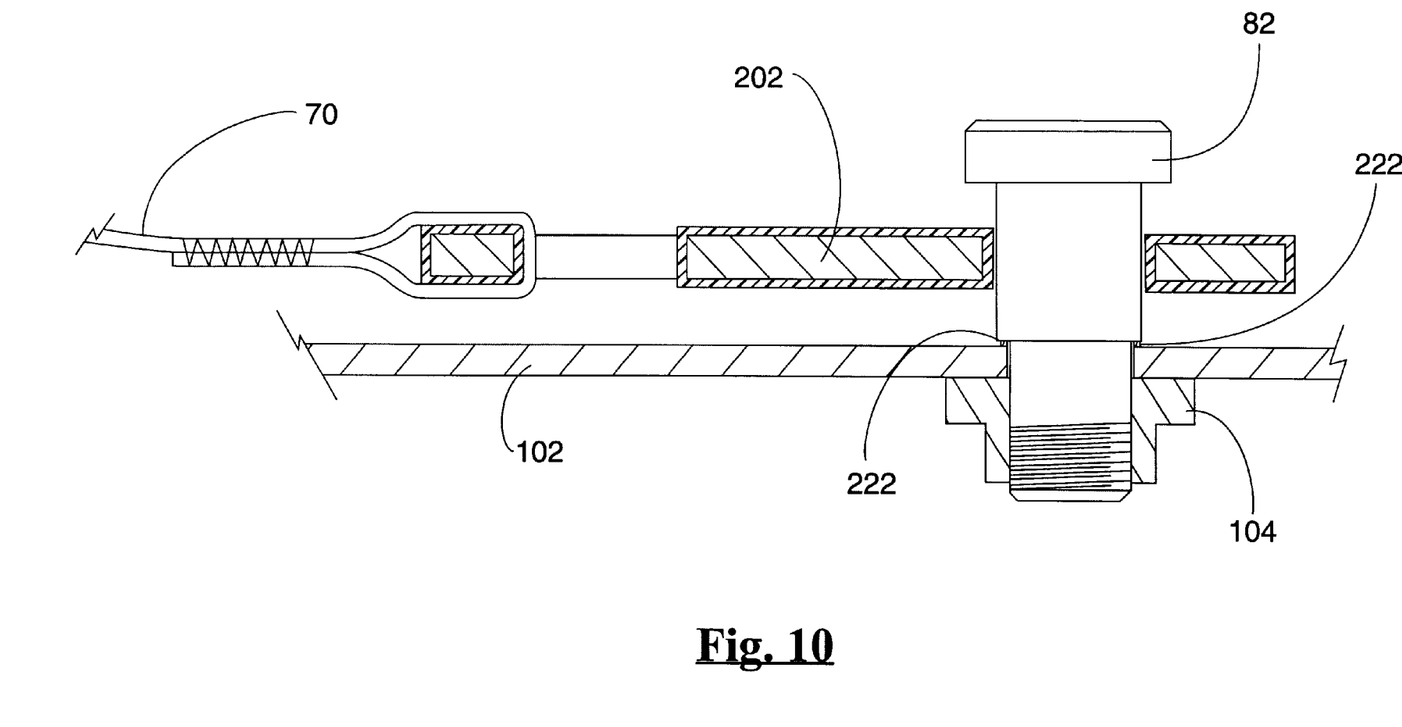
FIG. 10 shows the anchor mechanism secured to a vehicle component.

During installation of the anchor mechanism 200 to the vehicle, the bolt 82 is inserted within the threaded opening 100 of the vehicle part 102 and fastened thereto. As the bolt 82 is tighten the bolt shoulder 94 pushes on the ring 222 and stretches the ribs beyond the yield strength of the coating material thereby breaking the ribs and separating the ring 222 from the coating 214. As the ribs are stressed, they stretch and become thin and they break. Additionally, with the ribs 224 now broken the bolt 82 is free to rotate relative to the coating material forming the opening 210a. FIG. 10 shows the anchor mechanism 200 secured to the vehicle part 102.

Figure 11:
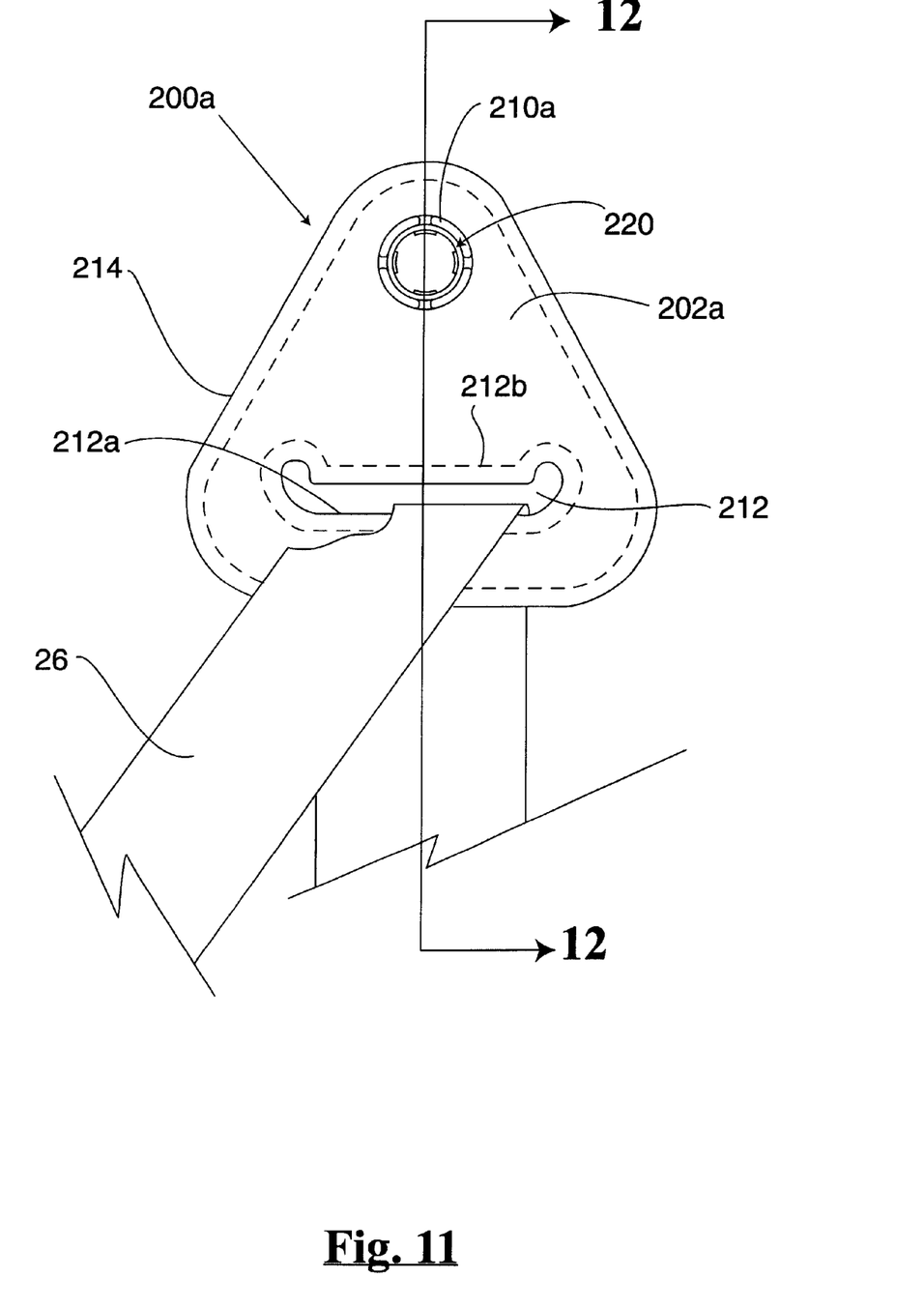
FIG. 11 illustrates an alternate embodiment of the invention.
Figure 12:
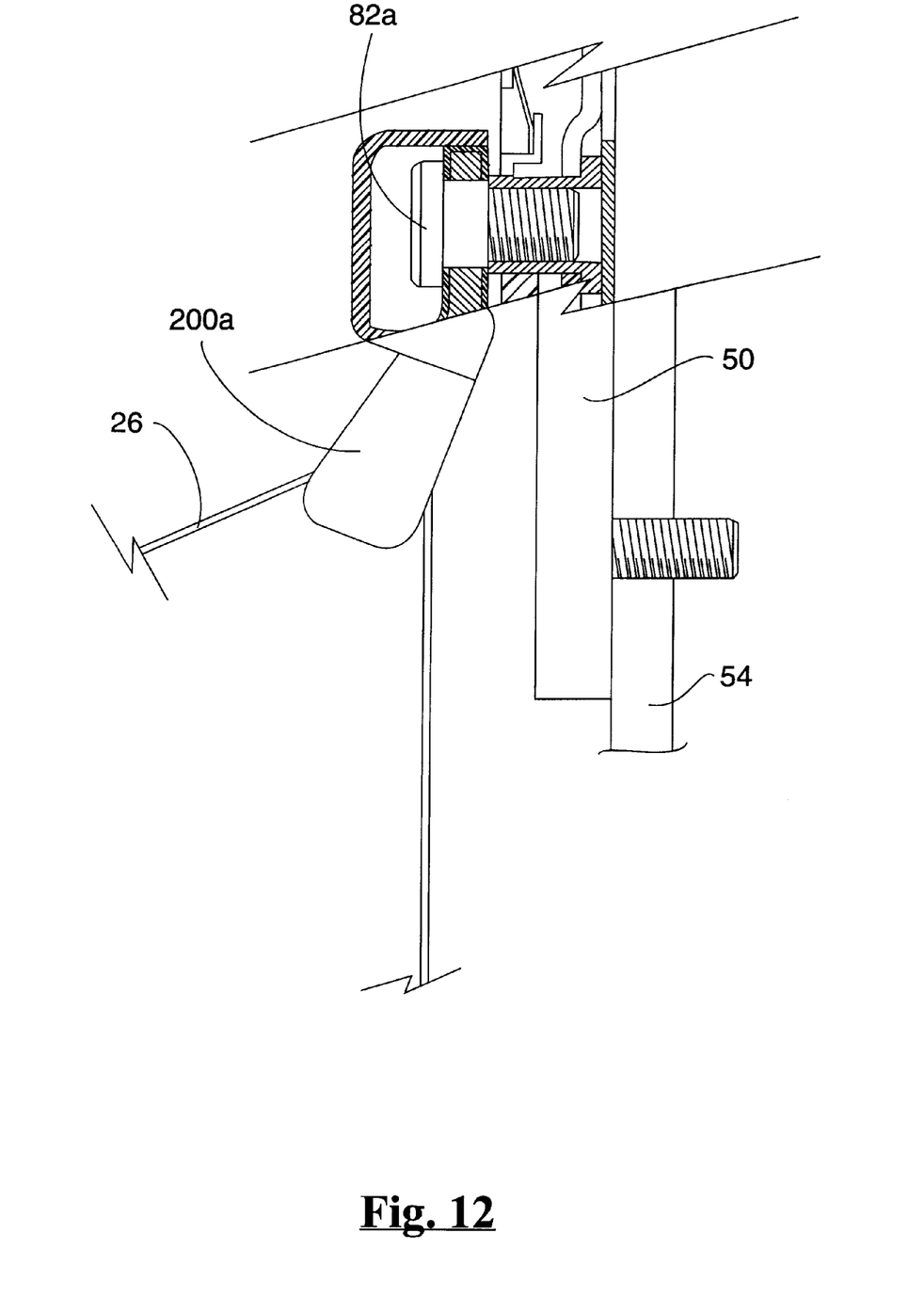
FIG. 12 illustrates a cross-sectional view of the alternate embodiment.

The present invention also finds application as an anchor mechanism 200a adaptable for use as a web guide or D-ring 52 as shown in FIGS. 11 and 12. With regard to FIGS. 11 and 12, the generally oblong opening 212 of FIG. 4 has been replaced by an arcuate web slot 212b which is typical of D-rings. The plate 202a is generally triangular in shape to accommodate the wider slot 212b. The plate 202a additionally includes opening 210. The plate 202a is coated, such coating material shown by numeral 214, to provide an abrasion-resistant wall or coating 214a about the slot or opening 212b. The actual web slot formed by the coating material is shown by numeral 212a. The plate 202a additionally includes the breakaway retainer 220 identical to that shown above. A bolt 82a is received within the retainer mechanism 220. The bolt 82a is similar in shape to bolt 82, however neck portion 82 is shorter to restrict the coated plate 202a from substantially sliding axially while still permitting the plate to rotate about the bolt 82a.

The plate 202 can be bent so that opening 212a is elevated relative to the fastener opening 210a. Further, the plate can be straight as illustrated or twisted to accommodate different mounting orientations. The plate 202 can be partially coated forming the integral retainer 220 but uncoated at the other end. The opening 212 can be removed if the strap 70 is to be bolted, welded or riveted thereto.

Many changes and modifications in the above-described embodiment of the invention can, of course, be carried out without departing from the scope thereof. Accordingly, that scope is intended to be limited only by the scope of the appended claims.

What is claimed is:

1. An anchor mechanism comprising:
   a load bearing member (202) having first opening (210);
   a coating (214) covering the member (202) at least in the vicinity of the first opening, forming the interior walls (214b) of the opening (210) to define a first coated opening (210a);
   the coating (216) proximate opening (210a) formed into a breakaway retaining means (220) for retaining a fastening bolt (82,82a) and for breaking away during installation of the bolt to a cooperating part (102).

2. The anchor mechanism as defined in claim 1 wherein the breakaway retaining means (220) comprises an integrally formed ring (222) supported relative to the coated opening (210a) by a plurality of ribs (224), the ring, on an interior surface thereof, including holding means (226) to secure the bolt to the ring prior to installation of the anchor mechanism.

3. The anchor mechanism as defined in claim 1 further including a second opening (212) coated to form a second coated opening.

4. The anchor mechanism as defined in claim 3 including an anchor strap means linking a seat belt component to the member.

5. The anchor mechanism as defined in claim 4 used as a web guide.

* * * * *